US010782906B1

(12) United States Patent
Bahirat et al.

(10) Patent No.: US 10,782,906 B1
(45) Date of Patent: Sep. 22, 2020

(54) MEMORY SUBSYSTEM INTERFACE TO RELATE DATA AND TO RETRIEVE RELATED DATA

(71) Applicant: Micron Technology, Inc., Boise, ID (US)

(72) Inventors: Shirish D. Bahirat, Longmont, CO (US); William Akin, Morgan Hill, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 16/514,360

(22) Filed: Jul. 17, 2019

(51) Int. Cl.
*G06F 3/06* (2006.01)

(52) U.S. Cl.
CPC ............ *G06F 3/0638* (2013.01); *G06F 3/061* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 8,341,345 B2* | 12/2012 | Tulskie | ................ | G06F 3/0605 711/100 |
| 2003/0227487 A1* | 12/2003 | Hugh | ................ | G06F 16/9024 715/777 |
| 2013/0013650 A1* | 1/2013 | Shum | ................ | G06F 16/24573 707/805 |
| 2013/0297894 A1* | 11/2013 | Cohen | ................ | G06F 3/0679 711/154 |
| 2014/0059017 A1* | 2/2014 | Chaney | ................ | G06F 16/25 707/692 |
| 2015/0120731 A1* | 4/2015 | Nemery | ................ | G06F 16/285 707/737 |

* cited by examiner

*Primary Examiner* — Edward J Dudek, Jr.
*Assistant Examiner* — Ralph A Verderamo, III
(74) *Attorney, Agent, or Firm* — Nicholson De Vos Webster & Elliott LLP

(57) ABSTRACT

A memory subsystem obtains commands from a host system to relate data items. Relationship data stored in a memory of the memory subsystem is updated to include relations between data items stored in a media of the memory subsystem. The memory subsystem obtains commands from the host system to read data items related to a specified data item. Based on the relationship data, the memory subsystem determines or identifies data items related to the specified data item and locates the related data items based on mapping data stored in the memory that includes physical addresses of the related data items on the media. The memory subsystem sends the related data items to the host system.

20 Claims, 11 Drawing Sheets

MEMORY SUBSYSTEM INTERFACE TO RELATE DATA AND TO RETRIEVE RELATED DATA

TECHNICAL FIELD

The present disclosure generally relates to a memory subsystem interface, and more specifically, relates to an interface that allows the memory subsystem to track relationships between data stored by the memory subsystem and to retrieve data based on those relationships.

BACKGROUND ART

A memory subsystem can be a storage system, such as a solid-state drive (SSD), or a hard disk drive (HDD). A memory subsystem can be a memory module, such as a dual in-line memory module (DIMM), a small outline DIMM (SO-DIMM), or a non-volatile dual in-line memory module (NVDIMM). A memory subsystem can include one or more memory components that store data. The memory components can be, for example, non-volatile memory components and volatile memory components. In general, a host system can utilize a memory subsystem to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
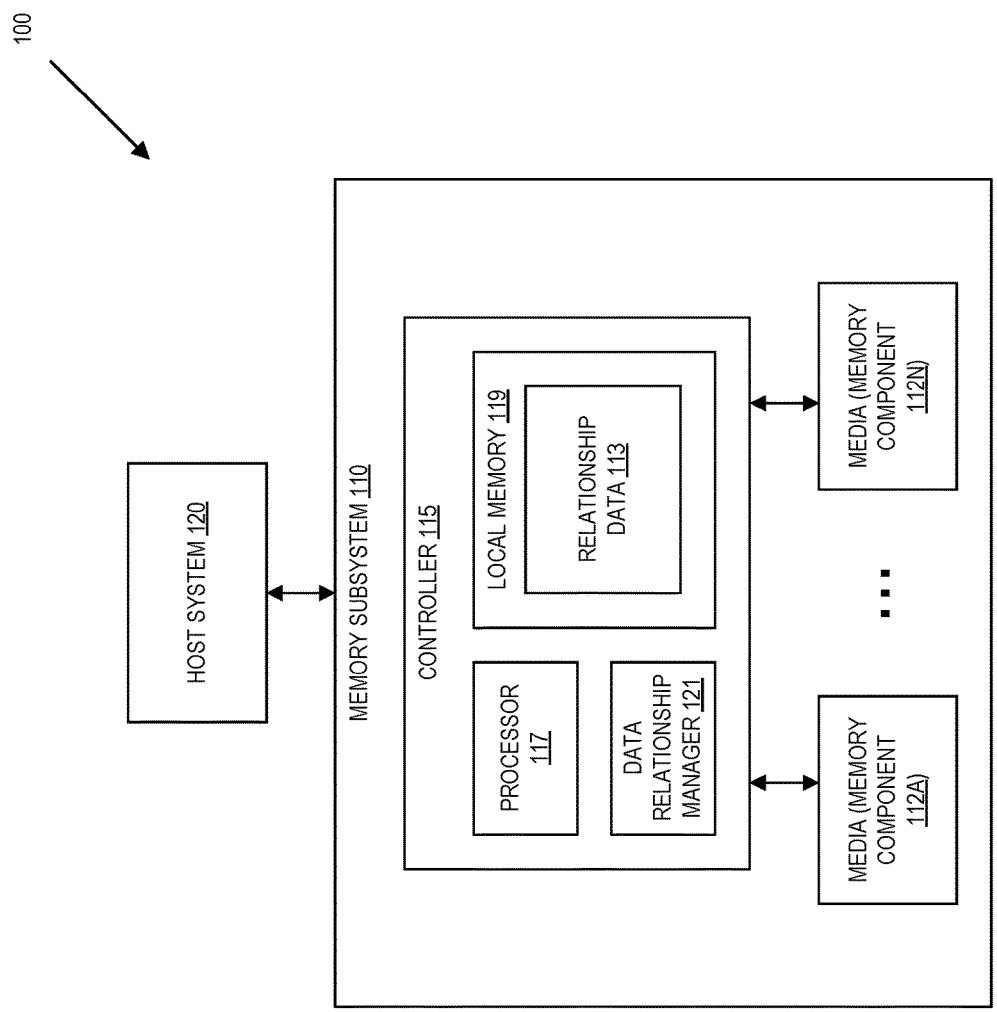
FIG. 1 illustrates an example computing environment that includes a memory subsystem in accordance with some embodiments of the present disclosure.

Aspects of the present disclosure are directed to organizing data in a memory subsystem. A memory subsystem is also hereinafter referred to as a "memory device." An example of a memory subsystem is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory subsystem is a storage device that is connected to the central processing unit (CPU) via a peripheral interconnect (e.g., an input/output bus, a storage area network, etc.). Examples of storage devices include a solid-state drive (SSD), a flash drive, a universal serial bus (USB) flash drive, and a hard disk drive (HDD). In some embodiments, the memory subsystem is a hybrid memory/storage subsystem. In general, a host system can utilize a memory subsystem that includes one or more memory components. The host system can provide data to be stored at the memory subsystem and can request data to be retrieved from the memory subsystem.

Many software applications include aspects that discover and establish relations (or "relationships") between data. One way to track relations between data is through the use of a graph, where nodes in the graph represent data items and edges between nodes in the graph represent relations between data items. For example, a graph employed by an e-commerce software application might have nodes corresponding to products. A software application might track users' browsing history and, when users frequently view products in succession, establish a relationship between the viewed products by adding an edge between the products' nodes. When another user visits a product page, the software application can issue a series of read operations to a memory subsystem to fetch related product data (e.g., product pages of other products whose nodes in the graph that share edges).

As another example, a graph employed by a social media software application might have nodes corresponding to a user's photographs. This social media software application might allow the user to cluster or group photographs by an album identifier (e.g., "Italy 2018") by creating an album or group node and relating each of the nodes associated with user-selected photographs with that album or group node. With existing memory subsystems, when a user accesses an album, the software application issues a series of read operations to a memory subsystem to fetch thumbnails associated with each of the photographs in the album.

The software applications execute in a host environment that provides for data storage and retrieval via a memory subsystem. The software applications typically rely on a file system and/or one or more software drivers that allow the host system to issue commands to the memory subsystem. Exemplary commands include reading data from a location and writing data to a location of the memory subsystem. For example, the host system allocates some amount of storage of the memory subsystem for data storage operations. The host system writes data (e.g., a photograph, a product description, etc.) to a location and later retrieves the data from the location. In block-based storage interfaces, the host system specifies a location as a logical address, and the memory subsystem translates logical addresses to physical addresses associated with locations in memory components of the memory subsystem. In key-based storage interfaces, the host system specifies a location as a string or key, and the memory subsystem translates the key to a physical address (or addresses) in the memory components. In some interfaces, a more complex host driver may have direct access to physical-addresses of locations in the memory components and issue operations based on physical rather than logical addresses. Interfaces in which the host system has knowledge of the physical addresses of the memory components are sometimes referred to as "open-channel," while interfaces in which the physical address of the memory components are abstracted from the host system are sometimes referred to as "closed-channel."

When relations between data exist, existing host system to memory subsystem interfaces dictate that software applications (or a file system, driver, etc. supporting the software applications) must provide a series of locations (e.g., logical addresses or keys) to separately identify and read each of the related data items from the memory subsystem. The overhead associated with individually identifying each of the related data items negatively impacts the performance of data retrieval operations and increases the amount of traffic on the interconnect between the host system and the memory subsystem (whether the memory subsystem is locally connected via a bus or remotely connected via a network interface). Further, many memory subsystem architectures offer a high degree of operational parallelism (e.g., concurrently reading from or writing to multiple locations) that is concealed from the host system which limits the performance of the interface between the host system and the memory subsystem.

Aspects of the present disclosure address the above and other deficiencies by introducing an interface that allows software applications to inform a memory subsystem about relations in the data being stored, which the memory subsystem can then use to improve the performance of the host system to memory subsystem interface. In an exemplary embodiment, the memory subsystem includes a data structure that tracks relations between data items stored in memory components of the memory subsystem. A software application can issue commands to the memory subsystem to relate or unrelate data items, to group data items (whether related or not), or to classify data items. The memory subsystem can use the relations, groupings, or classifications to improve various operations, such as the management of the memory components and/or the data storage or retrieval in response to commands from the host system. For example, the host system can issue a single command to read all of the data related to a data item or to read a group of data items. As another example, the host system can store related data on concurrently accessible portions of the memory components to improve read performance, store similarly classified data (e.g., based on re-write frequency) on common portions of the memory components to improve media management (e.g., garbage collection), etc.

FIG. 1 illustrates an example computing environment 100 that includes a memory subsystem 110 in accordance with some embodiments of the present disclosure. The memory subsystem 110 can include media, such as memory components 112A to 112N. The memory components 112A to 112N can be volatile memory components, non-volatile memory components, or a combination of such. In some embodiments, the memory subsystem is a storage system. An example of a storage system is an SSD. In some embodiments, the memory subsystem 110 is a hybrid memory/storage subsystem. In general, the computing environment 100 can include a host system 120 that uses the memory subsystem 110. For example, the host system 120 can write data to the memory subsystem 110 and read data from the memory subsystem 110.

The host system 120 can be a computing device such as a desktop computer, laptop computer, network server, mobile device, or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory subsystem 110. The host system 120 can further utilize an NVM Express (NVMe) interface to access the memory components 112A to 112N when the memory subsystem 110 is coupled with the host system 120 by the PCIe interface. The physical host interface can provide an interface for passing control, address, data, and other signals between the memory subsystem 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random-access memory (DRAM), synchronous dynamic random-access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

The memory subsystem 110 includes a data relationship manager 121 that can track relations between data stored in the memory subsystem 110 in the relationship data 113. In particular, the data relationship manager 121 enables an interface through which the host system 120 can specify relationships between data being stored within the memory subsystem 110 and can retrieve data based on those relationships. In some embodiments, the controller 115 includes at least a portion of the data relationship manager 121. In some embodiments, the data relationship manager 121 is implemented in hardware (e.g., processing device, circuitry, dedicated logic, programmable logic, microcode, hardware of a device, integrated circuit, etc.) that is part of the controller 115 to perform at least a portion of the operations attributed to the data relationship manager 121 as described herein. In some embodiments, the data relationship manager 121 is implemented in software (e.g., as instructions) stored in the local memory 119 to be executed by a processor 117 (processing device) to perform at least a portion of the operations attributed to the data relationship manager 121 as described herein.

FIGS. 2A-2F illustrate a sequence of commands to inform the memory subsystem of relations between data items in accordance with some embodiments of the present disclosure. In each of these figures, a host system 120 is executing an application 288. The application 288 identifies that generates, processes, or accesses data stored within the memory subsystem 110 can identify relationships between that data. In the illustrated embodiments, the application 288 tracks the data relationships with a graph 290, although other data structures can be used. The application 288 issues commands to the memory subsystem 110 via one or more software and hardware interfaces (not shown). For example, the application 288 can be executing within an operating system environment (not shown) that includes a file system, memory subsystem driver, and physical host interface driver (e.g., PCIe driver) through which the application 288 is able to store and retrieve data using the memory subsystem 110.

The memory subsystem 110 includes the controller 115. The controller 115, or another interface component (not shown), receives and carries out or dispatches commands from the host system 120 to other components of the memory subsystem or controller, such as the data relationship manager 121. In this example, the controller 115 includes the data relationship manager 121 and the local memory 119. The local memory includes the relationship data 113. In the illustrated embodiment, the relationship data 113 is represented as a table that includes an index field 205 and a related field 210. The data relationship manager 121 can modify the relationship data 113 to reflect changes to relationships between data stored by the memory subsystem 110 and can search the relationship data 113 based on an index to identify data related to the index.

In this example, the application 288 has previously stored three pieces of data (sometimes referred to as "items" or "data items") in the memory subsystem 110, referenced by labels A, B, and C. In this context, A, B, and C represent locations within the memory subsystem 110 and are generally referred to herein as "data identifiers." For example, if the memory subsystem 110 provides a block-based interface, A, B, and C would correspond to block addresses. Such addresses may be part of one of many logical partitions, namespaces, or other divisions of the entirety of the memory subsystem media (e.g., media 112 in FIG. 1). The memory subsystem 110 translates logical addresses to physical addresses within the media using logical-to-physical address lookup information. As another example, if the memory subsystem 110 provides a key-value based interface, A, B, and C would correspond to keys (e.g., strings) that can be used to uniquely identify the location of the associated value stored within the memory subsystem 110. Again, the keys identify data in one of many divisions of the memory subsystem media, and the memory subsystem 110 translates the keys using key-to-physical address lookup information.

In an exemplary embodiment, the memory subsystem 110 provides an interface to the host system 120 to allow the host system 120 to issue LINK, UNLINK, GROUP, UNGROUP, and READRELATED commands (sometimes referred to herein as operations). Such operations commands can be identified using an operation code ("opcode") to distinguish them from other standard operations (e.g., READ, WRITE, FLUSH, etc.). For example, under the NVMe protocol, the opcode field of Command Dword 0 can be used to specify other commands, such as the LINK, UNLINK, GROUP, UNGROUP, or READRELATED command.

The LINK operation creates a relationship between data items stored in the memory subsystem 110. In one embodiment, the LINK operation includes at least two data identifiers as parameters. During processing of a LINK operation by the memory subsystem 110, the data relationship manager 121 creates the corresponding relationships between the data items associated with the data identifiers in the relationship data 113. In some embodiments, the LINK operation can include additional parameters or be divided into different operations. Such additional parameters or different operations can be used to specify a strength of the relationship that indicates how strongly the two data items are related (e.g., a value from 0-7), to specify the directionality of the relationship (e.g., whether unidirectional or bidirectional), etc. In some embodiments, the parameters can establish different numbers of relationships (e.g., one-to-many, many-to-one, many-to-many). For example, the parameters can include two arrays of data identifiers and indicate the controller 115 is to establish a bidirectional relationship between the respective data identifiers. In some embodiments, a WRITE command can be combined with a LINK command to write a data item associated with a data identifier to the memory subsystem 110 and relate the data identifier to other data identifiers in the relationship data 113.

The UNLINK operation deletes a relationship between data items stored in the memory subsystem 110. In one embodiment, the UNLINK operation includes at least two data identifiers as parameters. During processing of an UNLINK operation by the memory subsystem 110, the data relationship manager 121 deletes the corresponding relationships between the data items associated with the data identifiers in the relationship data 113. In some embodiments, the UNLINK operation can include additional parameters or be divided into different operations. In one example embodiment, such additional parameters or different operations can be used to specify the directionality of the relationship to be removed (e.g., whether unidirectional or bidirectional). In some embodiments, the parameters can establish different numbers of relationships to be removed (e.g., one-to-many, many-to-one, many-to-many). For example, the parameters can include a target data identifier and an array of other data identifiers to cause the controller 115 is to remove all links from the target data identifier to any of the data identifiers in the array.

The GROUP operation creates a grouping of data items stored in the memory subsystem 110. The GROUP operation allows data items to be grouped without having a top-level data identifier (which is associated with a data item stored in the media) through which to associate the other data items. In one embodiment, the GROUP operation includes at least one group identifier and two or more data identifiers as parameters. In some embodiments, the GROUP operation can include additional parameters or be divided into different operations. Such additional parameters or different operations can be used to specify a "temperature" of the data items in the group or that indicates how quickly the data items are likely to be invalidated (e.g., a value from 0-7 where groups with a value of 0 are highly likely to be invalidated and groups with a value of 7 are highly unlikely to be invalidated). During processing of a GROUP operation by the memory subsystem 110, the data relationship manager 121 associates the data items to the group identifier in the relationship data 113.

The UNGROUP operation removes specifically identified data items from a group or dissociates the grouping entirely. In one embodiment, the UNGROUP operation includes at least one group identifier and, optionally, one or more data identifiers as parameters. During processing of an UNGROUP operation that does not specify any data identifiers as parameters by the memory subsystem 110, the data relationship manager 121 deletes all entries relating to the specified group identifier from the relationship data 113. During processing of an UNGROUP operation that specifies one or more data identifiers as parameters by the memory subsystem 110, the data relationship manager 121 deletes any group entries identifying the specified one or more data identifiers from the relationship data 113. In some embodiments, the UNGROUP operation and the UNLINK operation may be a single operation that removes links from the relationship data 113 based on group or data identifier parameters.

The READRELATED operation reads data based on relationships between data items stored in the memory subsystem 110. In one embodiment, the READRELATED operation includes at least one data or group identifier as a parameter. During processing of a READRELATED operation by the memory subsystem 110, the data relationship manager 121 checks the relationship data 113 for the data or group identifier to obtain the related data identifier or identifiers. In some embodiments, the data relationship manager 121 can return the related identifier(s) to the controller 115, which in turn obtains the data value(s) associated with the related identifier(s) and returns the related data values to the host system 120 (e.g., by writing them to a buffer in host system memory). As a result, the host system 120 can obtain data items without specifying the associated data identifiers in the command to the memory subsystem. As an example, suppose the relationship data 113 relates data identifier 'X' to data identifiers 'Y' and 'Z.' The host system 120 can issue a READRELATED command to the memory subsystem 110 that includes data identifier X and does not include data identifiers Y or Z. In response, the memory subsystem 110 returns the data items associated with data identifiers Y and Z despite not being explicitly identified in the command from the host system 120.

Since the number and size of data items that may be returned in response to a READRELATED operation can vary, the returned information may include both the related data and identifying information. Continuing the above example in which data identifier X is related to data identifiers Y and Z, in responding to a READRELATED command that includes data identifier X, the controller 115 returns both the data identifiers Y and Z and their associated data items so that the host system 120 can distinguish between the data items Y and Z. In some embodiments, the READRELATED command may also return the data identifier and associated data item specified (e.g., data identifier X and the associated data item). For example, the READRELATED command may include a parameter that allows the host system to specify whether the command should return the data item associated with the data identifier specified in the command.

In some embodiments, the READRELATED operation can include additional parameters or be divided into different operations. For example, the READRELATED command can include an optional parameter to specify a value or threshold for the strength of the relationship between the data items to be returned (e.g., read related data items where the strength of the relationship is '2' or greater than '3'). As another example, the READRELATED command can include an optional depth parameter to specify how many levels of relationships the memory subsystem 110 should traverse in the return data. If, for example, data identifier G relates to data identifier H, data identifier H relates to data identifier I, but data identifier G does not directly relate to data identifier I, a READRELATED operation with a depth level "1" can return both the data items associated with both data identifiers H and I based on the single-level of indirection between data identifier G and data identifier I.

Parameters associated with these additional operations can be submitted as part of the data structure associated with a command or stored in temporary buffers within the host system memory (e.g., RAM, not shown) where the command data structure includes pointers to the buffer(s). In the latter case, upon receipt of the command, the controller 115 accesses the host system memory to fetch the associated parameters.

In FIGS. 2A-2F, the application 288 builds the graph 290 to track data relationships. In this example, each node in the graph 290 corresponds to an identifier (e.g., a data identifier or a group identifier), which themselves correspond to data items. As illustrated, nodes 291, 292, 293 correspond to data identifiers A, B, and C, respectively. Edges between nodes indicate that the associated data items are related to the identifier. Although the arrows on the edges indicate relationships between data identifiers are bidirectional, in some embodiments the relationships can be unidirectional, as described above.

Figure 2A:
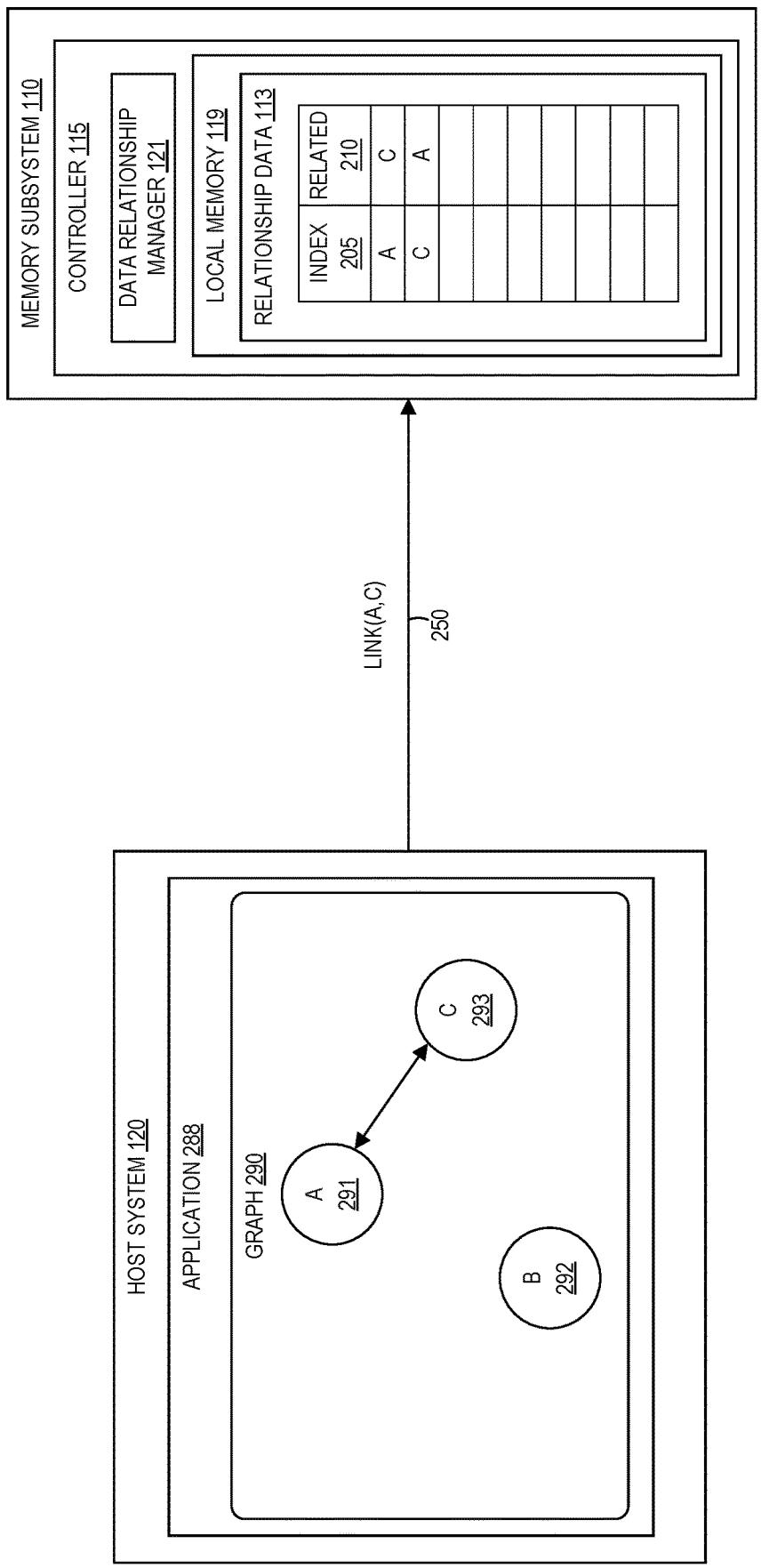
FIGS. 2A-2F illustrate a sequence of commands to inform the memory subsystem of relations between data items in accordance with some embodiments of the present disclosure.

As illustrated in FIG. 2A, the application 288 has associated data identifiers A and B and causes the host system 120 to send a command 250, including a LINK opcode, to create a relation between data identifiers A and C. Upon receiving the command 250 and obtaining the command parameters, the data relationship manager 121 updates the relationship data 113 to create the relationship between data identifiers A and C. In this example, because data identifier relationships are bidirectional and the relationship data 113 is illustrated as a table with an index 205, the table is updated to reflect the relationship of data identifier A to data identifier C and vice versa.

Figure 2B:
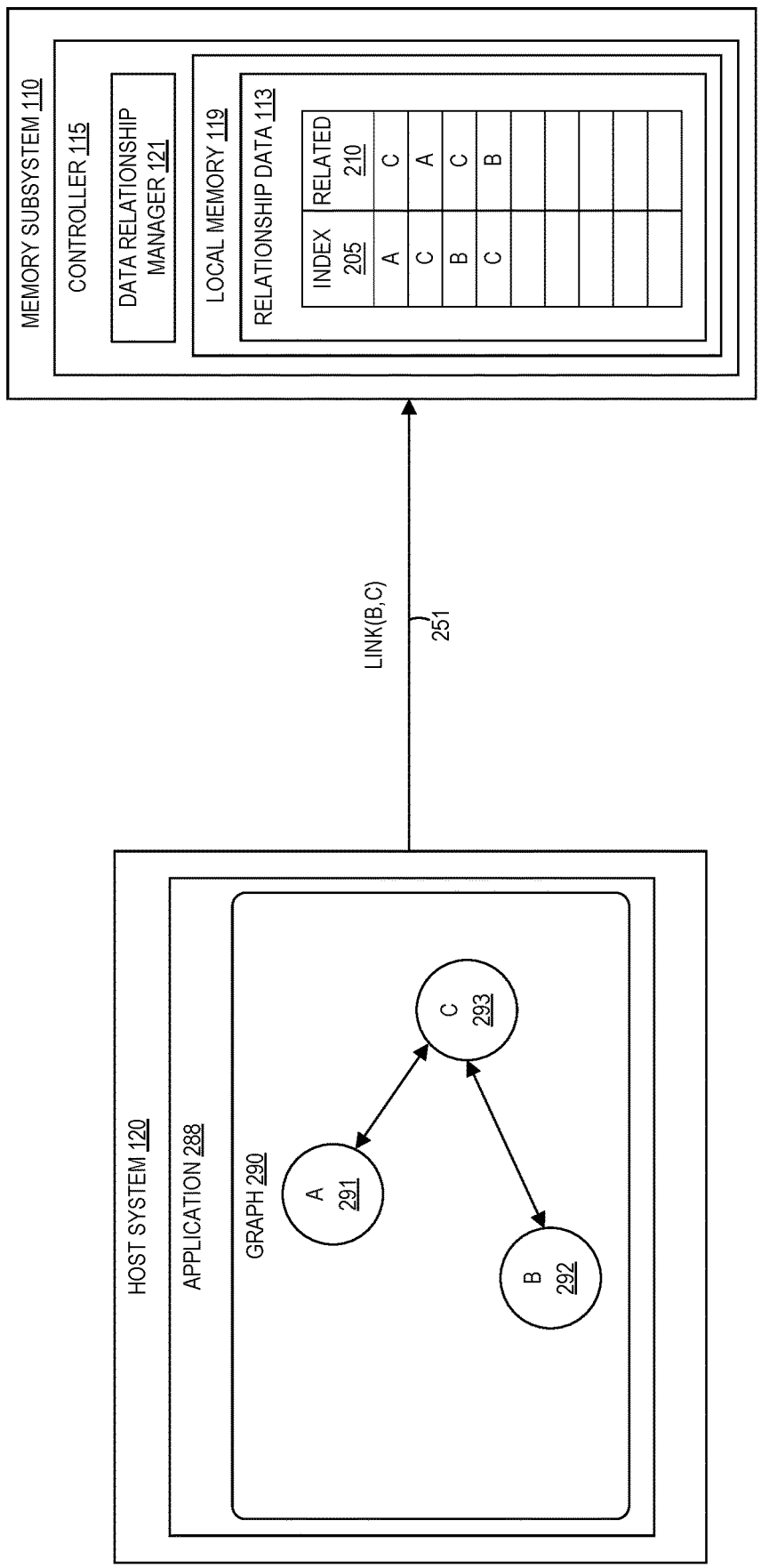

As illustrated in FIG. 2B, the application 288 has now associated data identifiers B and C and causes the host system 120 to send a command 251, including a LINK opcode, to create a relation between data identifiers B and C. Upon receiving the command 251 and obtaining the command parameters, the data relationship manager 121 updates the relationship data 113 to create the relationship between data identifiers B and C. Again, assuming a bidirectional relationship, data relationship manager 121 updates the relationship data 113 to reflect the relationship of data identifier A to data identifier C and vice versa.

Figure 2C:
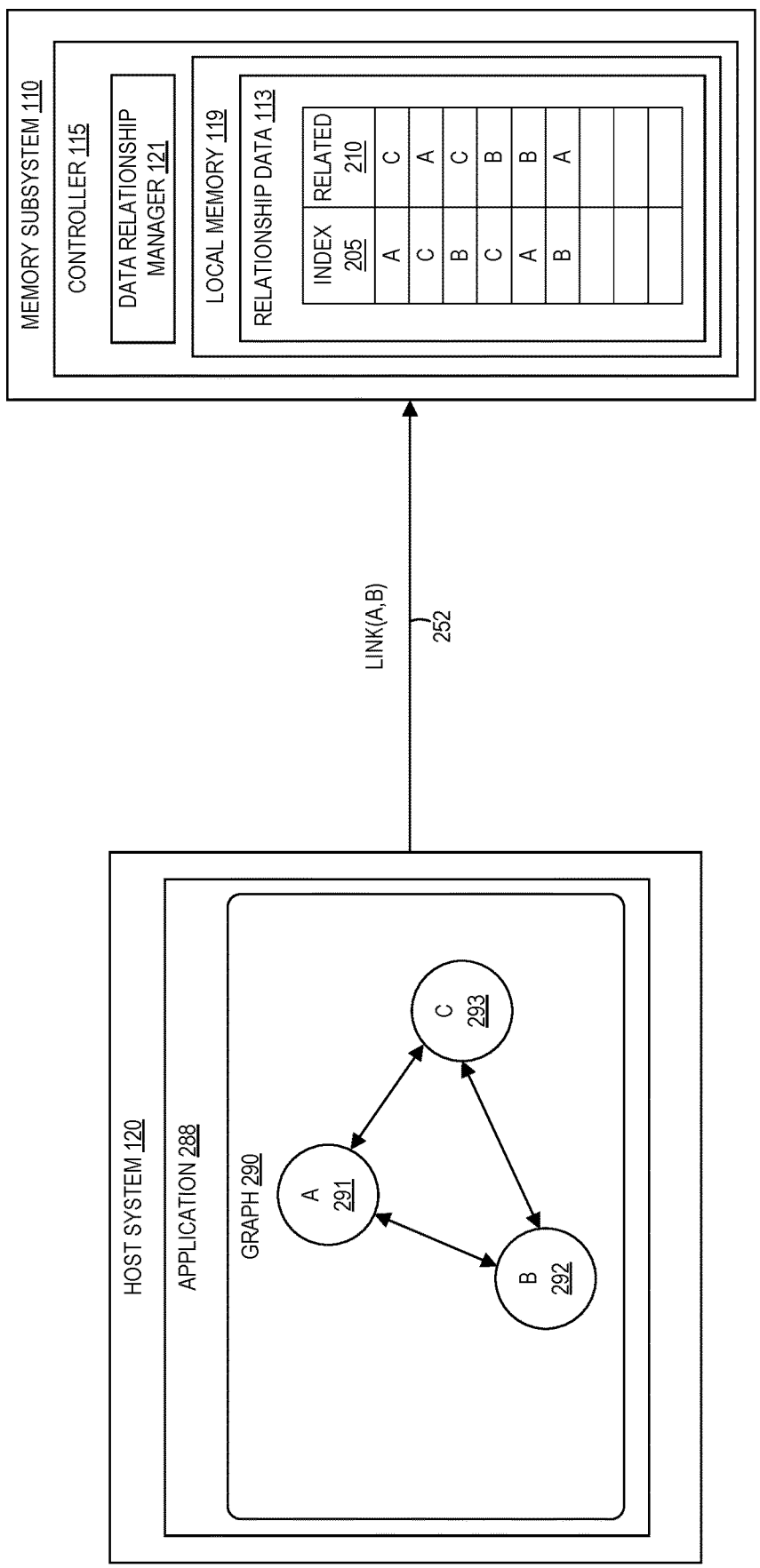

As illustrated in FIG. 2C, the application 288 has associated data identifiers A and B and causes the host system 120 to send a command 252, including a LINK opcode, to create a relation between data identifiers A and B. Upon receiving the command 252 and obtaining the command parameters, the data relationship manager 121 updates the relationship data 113 to create the relationship between data identifiers A and B. Again, assuming a bidirectional relationship, data relationship manager 121 updates the relationship data 113 to reflect the relationship of data identifier A to data identifier B and vice versa.

Figure 2D:
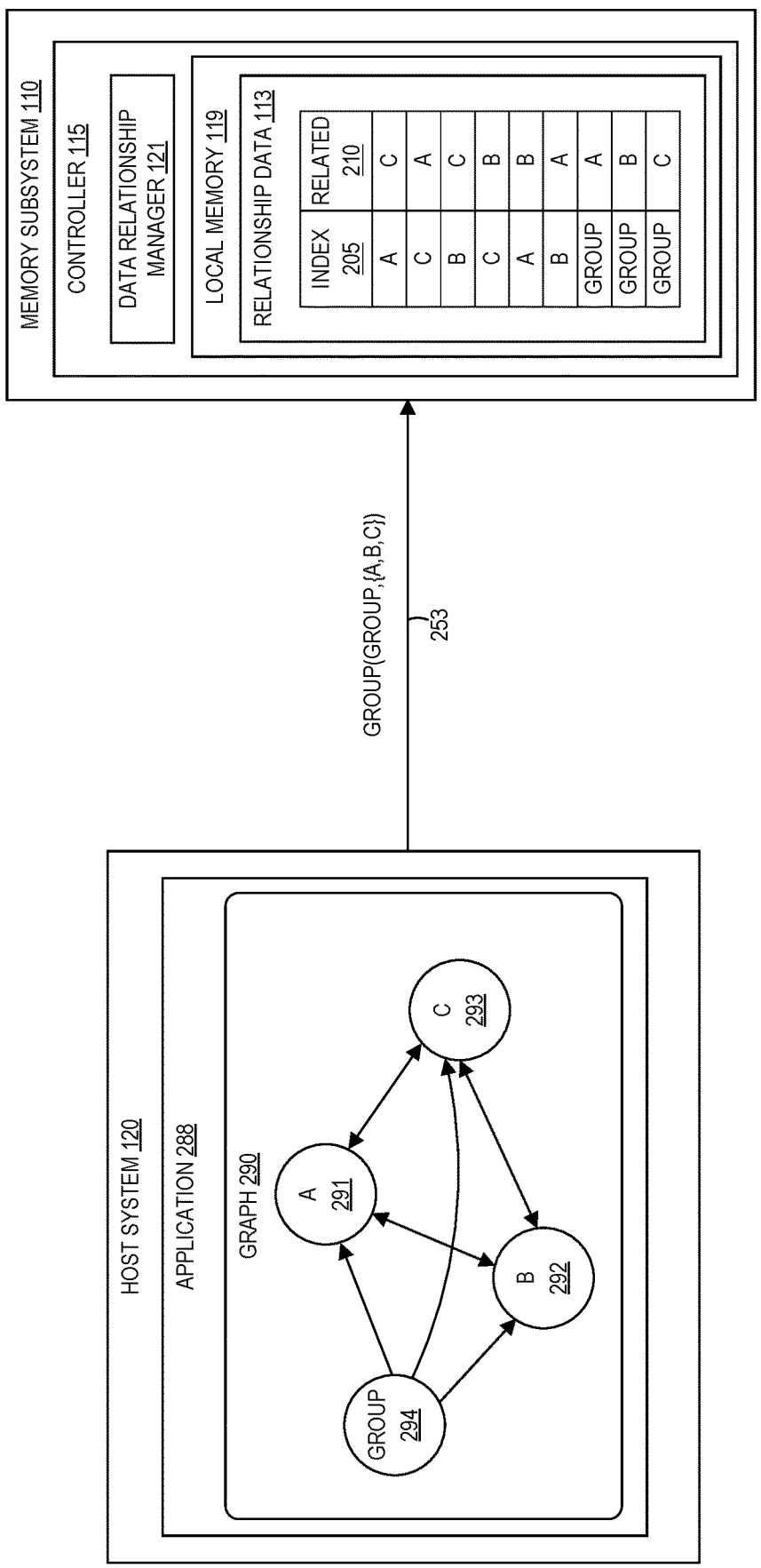

As illustrated in FIG. 2D, the application 288 has determined the data items associated with data identifiers A, B, and C should be grouped. The application 288 causes the host system 120 to send a command 253, including a GROUP opcode, to create a group identifier "GROUP" that associates data items A, B, and C. Upon receiving the command 253 and obtaining the command parameters, the data relationship manager 121 updates the relationship data 113 to create the group of data items A, B, and C. If group and data identifiers are grouped within the same data structure, entries in the data structure can include a flag to distinguish group identifiers from data identifiers. Alternatively, the relationship data 113 can have separate data structures for data identifier-to-data identifier relationships and for group identifier-to-data identifier relationships.

Figure 2E:
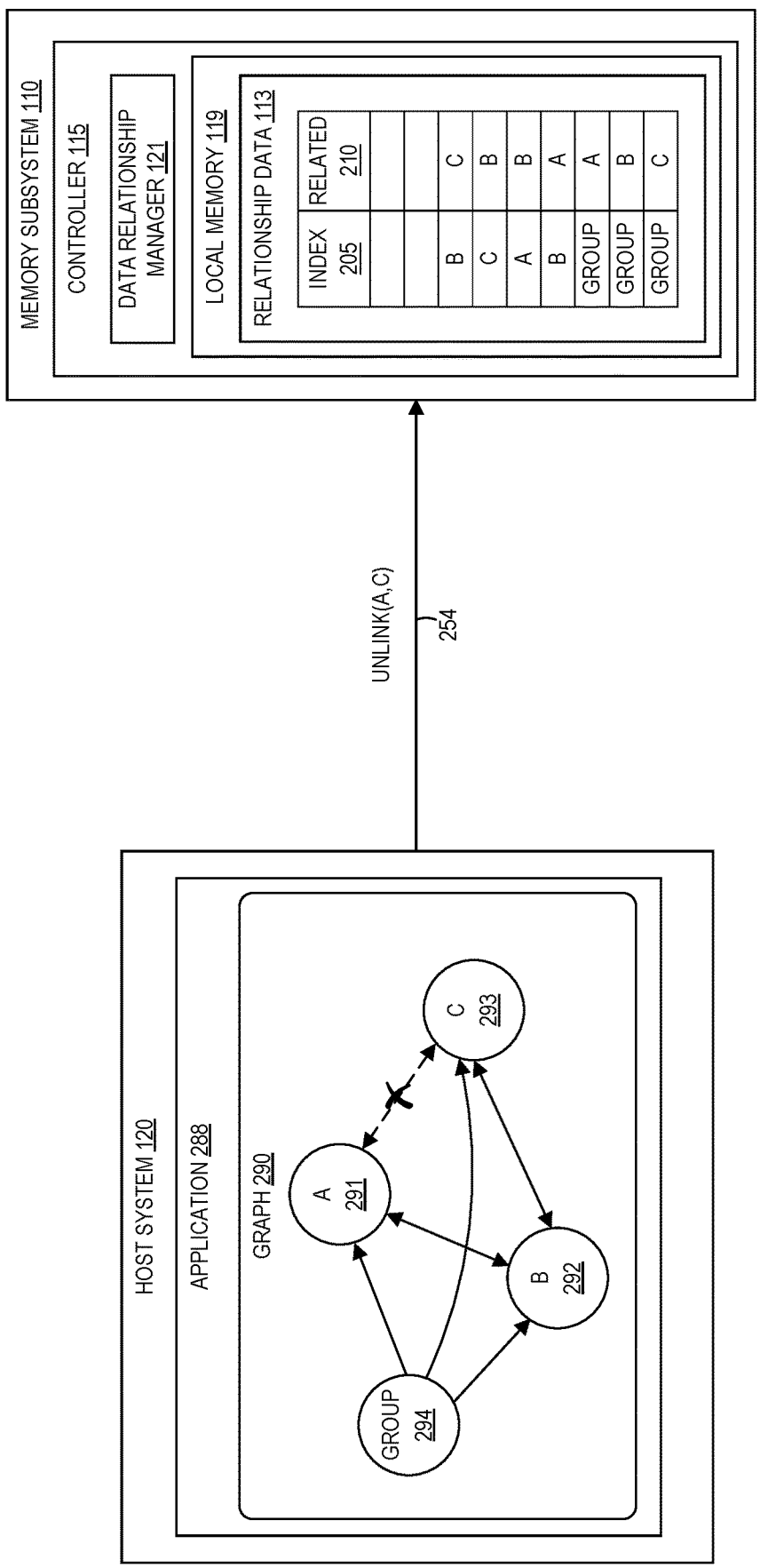

As illustrated in FIG. 2E, the application 288 has determined that the relationship between data items A and C is no longer applicable and causes the host system 120 to send a command 254, including an UNLINK opcode, to remove the relationship between data identifiers A and C. Upon receiving the command 254 and obtaining the command parameters, the data relationship manager 121 updates the relationship data 113 to remove the relationship between data identifiers A and C.

Figure 2F:
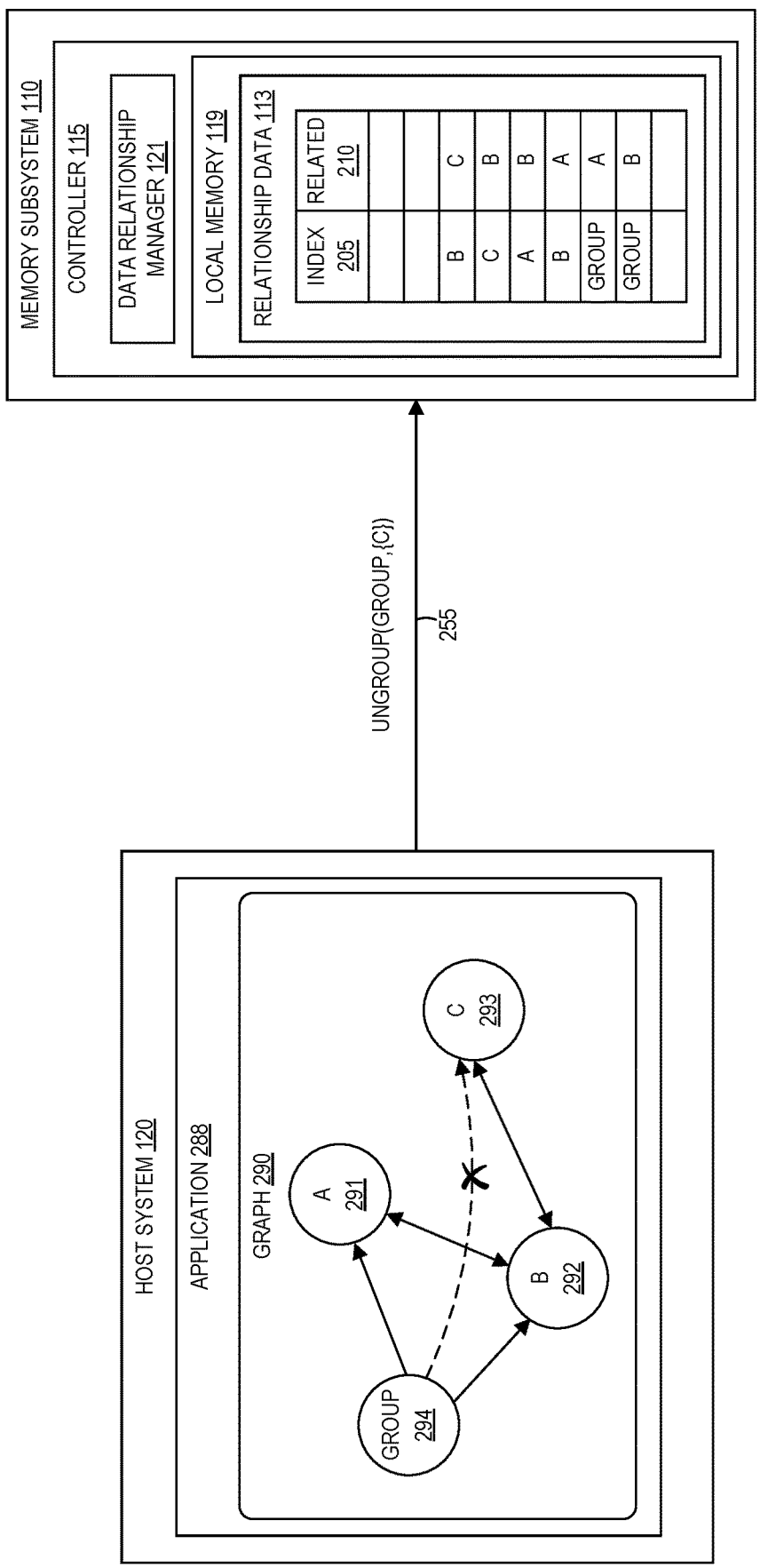

As illustrated in FIG. 2F, the application 288 has determined that data item C is no longer associated with the group identifier "GROUP." The application 288 causes the host system 120 to send a command 255, including an UNGROUP opcode, to remove data item C from the group identifier "GROUP." Upon receiving the command 255 and obtaining the command parameters, the data relationship manager 121 updates the relationship data 113 to remove data item C from the group.

Figure 3A:
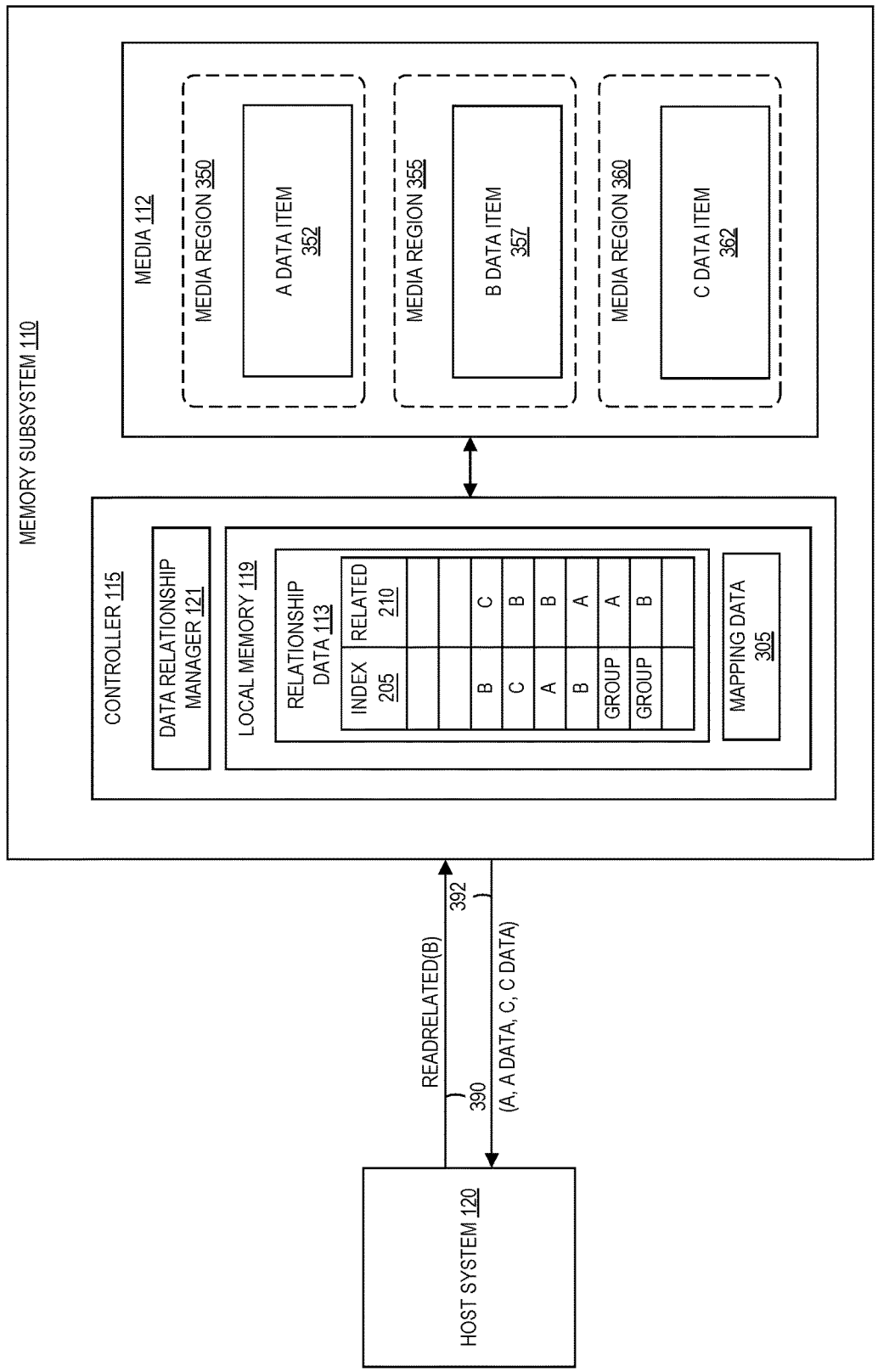
FIGS. 3A-3B illustrate commands to retrieve data from the memory subsystem based on relations between data items in accordance with some embodiments of the present disclosure.

FIG. 3A illustrates a command to retrieve data from the memory subsystem 110 based on relations between data items in accordance with some embodiments of the present disclosure. As illustrated, the memory subsystem 110 includes media 112 that includes data items 352, 357, and 362, which correspond to data identifiers A, B, and C, respectively. The relationship data 113 includes a set of relationships as established through the exemplary sequence of commands shown in FIGS. 2A-2F. The host system 120 sends a command 390, including a READRELATED opcode, to the memory subsystem 110. The command 390 includes data identifier B as a parameter or otherwise identifies data identifier B. Upon obtaining the command 390 and obtaining the command parameters, the data relationship manager 121 searches the relationship data 113 for entries with a data identifier B in the index 205, determines data identifier B is related to data identifiers A and C, and returns the related identifier(s) to the controller 115. The controller 115 then locates the data items associated with data identifiers A and C in the media 112 using the mapping data 305. As indicated above, a data identifier may be a key, a logical block address, or some other identifier that uniquely identifies the associated data item. The mapping data 305 may include a logical-to-physical address lookup table (e.g., for block-based interfaces) or a key-to-physical address lookup table (e.g., for key-based interfaces). Based on the physical addresses that correspond to data identifiers A and C, the controller 115 fetches the associated A data item 352 and C data item 362 from the media 112. The memory subsystem 110 returns the results to the READRELATED command in a message 392 sent to the host system 120. In some embodiments, the message 392 is a command data structure that includes the results or includes pointers to the results stored in one or more buffers in the host system memory (not shown).

Figure 3B:
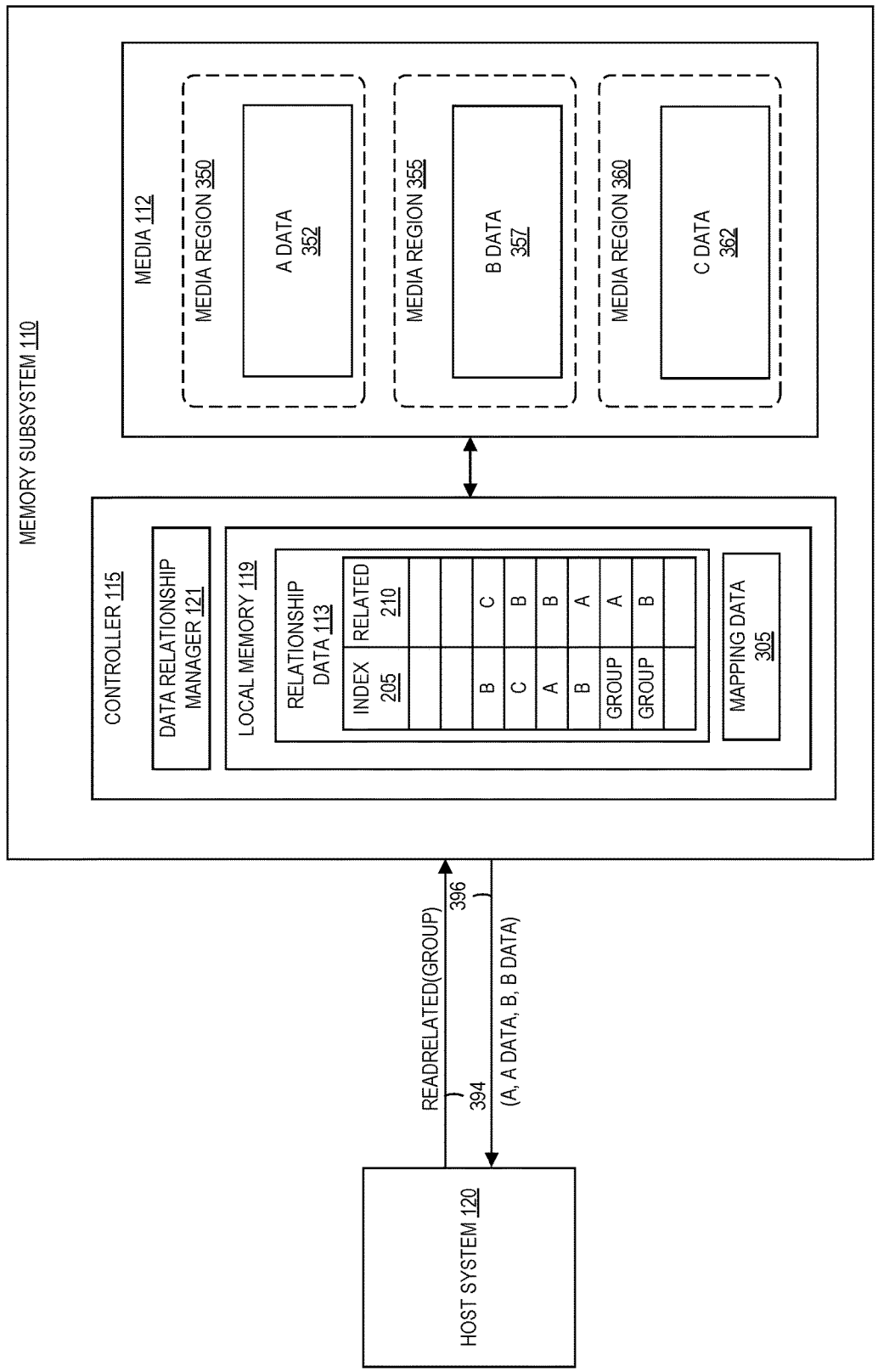

FIG. 3B illustrates another command to retrieve data from the memory subsystem 110 based on relations between data items in accordance with some embodiments of the present disclosure. The host system 120 sends a command 394, including a READRELATED opcode, to the memory subsystem 110. The command 394 includes group identifier "GROUP" as a parameter or otherwise identifies the group identifier "GROUP". Upon obtaining the command 394 and obtaining the command parameters, the data relationship manager 121 searches the relationship data 113 for entries with a group identifier "GROUP" in the index 205, determines group identifier "GROUP" includes data identifiers A and B, and returns the related identifier(s) to the controller 115. The controller 115 then locates the data items associated with data identifiers A and B in the media 112 using the mapping data 305, which, again, can use mapping data 305 to obtain the corresponding physical addresses of data items A and B, as described above. Based on the physical addresses that correspond to data identifiers A and B, the controller 115 fetches the associated A data item 352 and B data item 357 from the media 112. The memory subsystem 110 returns the results to the READRELATED command in a message 396 sent to the host system 120. In some embodiments, the message 396 is a command data structure that includes the results or includes pointers to the results stored in one or more buffers in the host system memory (not shown).

In some embodiments, the memory subsystem 110 can use the relationship data 113 to improve the performance of the memory subsystem 110. For example, the media regions 350, 355, and 360 can represent portions of the media 112 that are concurrently accessible by the controller 115. To improve read performance, the controller 115 or other component performing media management operations can read the relationship data 113 (or obtain it from the data relationship manager 121), determine which data items are related, and move those data items to concurrently accessible portions of the media 112 so that, as illustrated, the memory subsystem 110 can read the A data item 352, the B data item 357, and the C data item 362 concurrently to improve the read performance of the memory subsystem 110.

In some embodiments, the memory subsystem 110 can use the relationship data 113 in media management operations such as wear leveling, garbage collection, determining where to store data, etc. For example, the controller 115 or other component performing media management operations can read the relationship data 113 (or obtain it from the data relationship manager 121) and choose groups to wear-level or reclaim based on their associated "temperature"—e.g., moving data items in groups that are highly unlikely to be overwritten first (e.g., with a temperature value of 0), moving data items in groups that are less unlikely to be invalidated next (e.g., with a temperature value of 1), and so on, relying on the expect host behavior to overwrite groups of data items with higher temperature values and thereby reducing the amount of data that needs to be relocated for wear-leveling or reclamation. As another example, some memory subsystems 110 can include different types of memory (e.g., a memory subsystem with higher-speed SLC NAND and lower-speed MLC NAND, a memory subsystem with higher-speed volatile memory such as SDRAM and lower-speed non-volatile memory such as NAND, etc.). In such cases, the memory subsystem 110 can use the relationship data 113 in media management operations such as determining where to store data items based on their associated "temperature"—e.g., moving data items in groups that are highly unlikely to be overwritten to the higher-speed memory type (or lower speed memory type, depending on the application).

In some embodiments, such as certain "open-channel" devices that expose the physical address space of a memory subsystem 110 to the host system 120, the creation and maintenance of relationships between data items stored within the memory subsystem 110 is performed by part of the host system 110 such as by an application, operating system, driver, etc.

Figure 4:
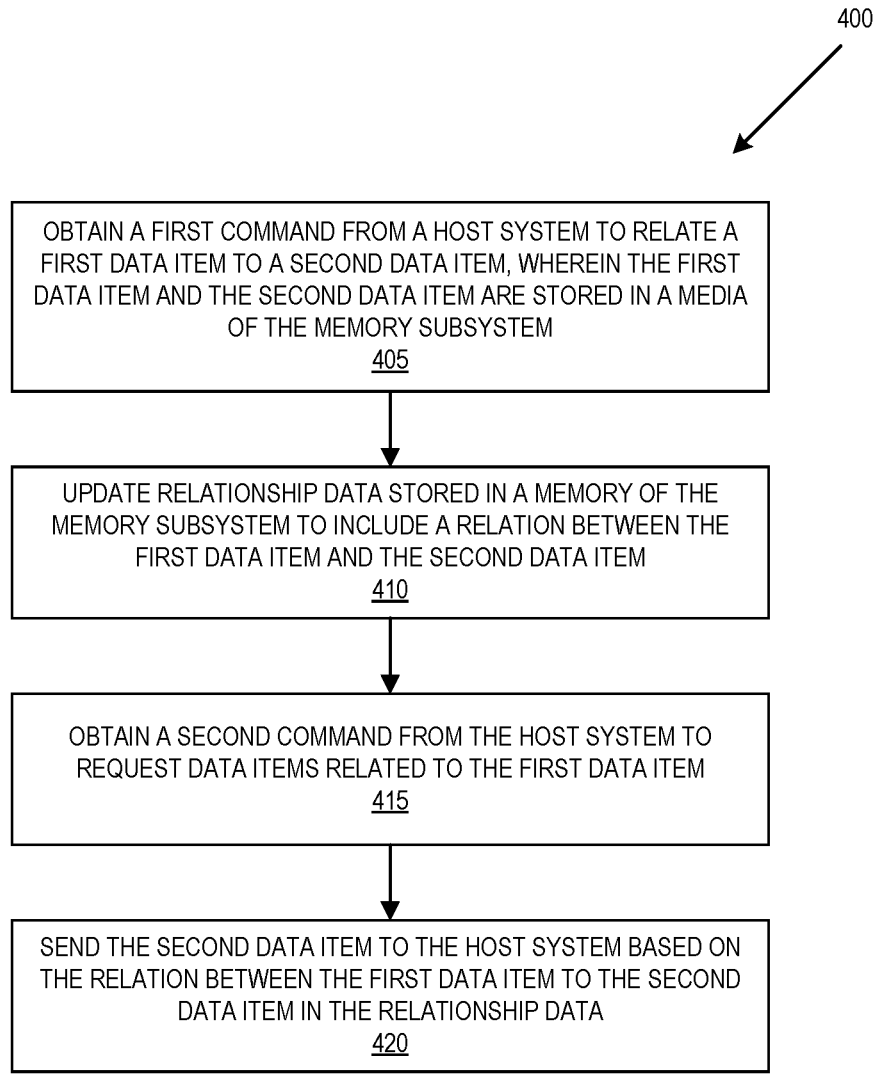
FIG. 4 is a flow diagram of an example method to relate data items and access related data items in a memory subsystem in accordance with some embodiments of the present disclosure.

FIG. 4 is a flow diagram of an example method 400 to relate data items and access related data items in a memory subsystem 110, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the data relationship manager 121 of FIGS. 1-3B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 405, the processing device obtains a first command from a host system to relate a first data item to a second data item, wherein the first data item and the second data item are stored in a media of a memory subsystem. As described herein, the memory subsystem obtains commands from the host system. In addition to read and write commands, embodiments disclosed herein permit the host system to create relations between data stored within the memory subsystem and to read data based on those relations. For example, the controller 115 can obtain a command to relate two or more data items in the memory subsystem from the host system, such as the LINK command, described above.

At block 410, the processing device updates, in response to the first command, relationship data stored in a memory of the memory subsystem to include a relation between the first data item and the second data item. As described herein, the memory subsystem maintains relationship data that associates data items stored within the media. In the embodiments illustrated in FIGS. 2A-2F and 3A-3B, the relationship data includes entries indexed based on a data identifier (e.g., a block address, a key, etc.). By searching the relationship data for a given index, the processing device (e.g., the controller 115 or data relationship manager 121) can identify other data identifiers associated with related data items. Entries within the relationship data can include additional information about the characteristics of the relationship, such as a strength of the relationship. In the example given with reference to FIG. 2A, a processing device receives a LINK command to link data identifiers A and B and updates the relationship data to include a relation from A to B and B to A (assuming a bidirectional relationship).

At block 415, the processing device obtains a second command from the host system to request data items related to the first data item. As described herein, the memory subsystem can use the relationship data to respond to queries not directly related to a particular data item. For example, rather than or in addition to returning the data item identified by data identifier "A," the memory subsystem can return data items related to the data item identified by data identifier "A." One exemplary command is the READ-RELATED command described above.

At block 415, the processing device sends, in response to the second command, the second data item to the host system based on the relation between the first data item to the second data item in the relationship data. Upon receipt of a command to read data related to an identifier, the processing device can search the relationship for any data items related to the identifier and return those data items to the originator of the request.

As described above, a memory subsystem provides a host system with an interface through which the host system can inform the memory subsystem of relations between data items stored therein. A data relationship manager, which may be a hardware component of the memory subsystem, a software component executed by a processing device of the memory subsystem, or a combination of hardware and software components, tracks relationships using relationship data. The relationship data can be used to locate related data based on a data identifier, such as a logical block address, a key, or other value that is used to identify the associated data item within the media of the memory subsystem. By relating data items, the host system can fetch related data indirectly by, for example, requesting data related to a data identifier from the memory subsystem.

By creating relations between data stored within a memory subsystem, aspects of the performance of the memory subsystem are improved. For example, the host can fetch all of the data items related to a particular data item by sending the memory subsystem the data identifier associated with the particular data item in a request to read all related data. This reduces the amount of traffic on the interconnect between the host system and the memory subsystem (whether the memory subsystem is locally connected via a bus or remotely connected via a network interface) thereby increasing the performance of the memory subsystem and freeing up the interconnect for other components of the computer system or network. Further, the memory subsystem can use the relationships in determining where to store related data items to exploit the high degree of operational parallelism found in many memory subsystems. In doing so, the memory subsystem can reduce the amount of media management (e.g., garbage collection) by limiting the number of erasures that occur. Additionally, the memory subsystem can increase the read performance of related data items by storing them on concurrently accessible portions of the media.

Figure 5:
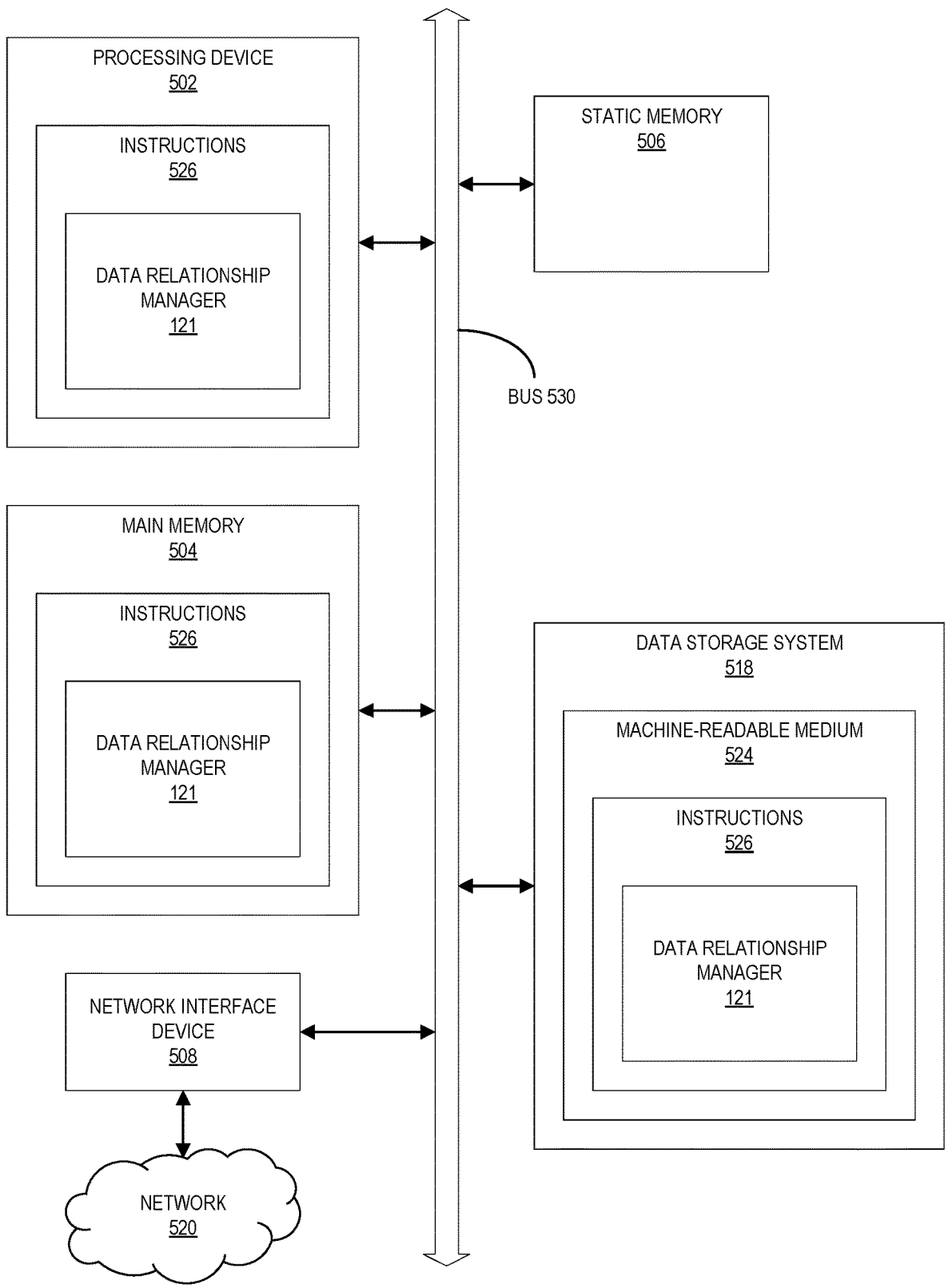
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the data relationship manager 121 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory subsystem 110 of FIG. 1.

In one embodiment, the instructions 526 include instructions to implement functionality corresponding to a data relationship manager (e.g., the data relationship manager 121 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, can carry out the computer-implemented method 400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
obtaining, by a memory subsystem, a first command from a host system to relate a first data item to a second data item and a third data item, wherein the first data item, the second data item, and the third data item are stored in a media of the memory subsystem;
updating, in response to the first command, relationship data stored in a memory of the memory subsystem to include a relation between the first data item and the second data item and a relation between the first data item and the third data item;
obtaining a second command from the host system to read data items related to the first data item;
identifying, in response to the second command, the second data item and the third data item based on the relation between the first data item and the second data item and the relation between the first data item and the third data item in the relationship data;
obtaining, in response to the second command, the second data item and the third data item based on mapping data stored in the memory of the memory subsystem, wherein the mapping data includes physical addresses of the second data item and the third data item on the media; and
sending, in response to the second command, the second data item and the third data item to the host system.

2. The method of claim 1, further comprising:
obtaining a third command from the host system to relate the second data item to a fourth data item;
updating, in response to the third command, the relationship data stored in the memory of the memory subsystem to include a relation between the second data item and the fourth data item;
obtaining a fourth command from the host system to read data items related to the first data item, wherein the fourth command indicates the relation to the first data item may be indirect; and
sending, in response to the fourth command, the fourth data item to the host system based on the relation between the first data item and the second data item and the relation between the second data item and the fourth data item in the relationship data.

3. The method of claim 1, further comprising:
obtaining a third command from the host system to unrelate the first data item and the second data item; and
updating, in response to the third command, the relationship data stored in the memory of the memory subsystem to remove the relation between the first data item and the second data item.

4. The method of claim 1, wherein the first data item is identified by the host system with a first key and the second data item is identified by the host system with a second key and wherein the second command does not include the second key.

5. The method of claim 1, further comprising:
obtaining a third command from the host system to relate the first data item and the second data item with a group identifier;
updating, in response to the third command, the relationship data stored in the memory of the memory subsystem to relate the first data item and the second data item to the group identifier;
obtaining a fourth command from the host system to read data items related to the group identifier; and
sending, in response to the fourth command, the first data item and the second data item to the host system based on the relation of the first data item and the second data item to the group identifier in the relationship data.

6. The method of claim 1, wherein the first command identifies a strength of a relation between the first data item and the second data item.

7. The method of claim 6, further comprising:
obtaining a third command from the host system to request data items related to the first data item based on a threshold strength; and
sending, in response to the third command, the second data item to the host system based on the relation between the first data item to the second data item in the relationship data if the strength of the relation between the first data item and the second data item is above the threshold strength.

8. A non-transitory computer-readable storage medium comprising instructions that, when executed by a processing device, cause the processing device to:
obtain a first command from a host system to relate a first data item to a second data item and a third data item, wherein the first data item, the second data item, and the third data item are stored in a media of a memory subsystem;
update, in response to the first command, relationship data stored in a memory of the memory subsystem to include a relation between the first data item and the second data item and a relation between the first data item and the third data item;
obtain a second command from the host system to read data items related to the first data item;
identify, in response to the second command, the second data item and the third data item based on the relation between the first data item and the second data item and the relation between the first data item and the third data item in the relationship data;
obtain, in response to the second command, the second data item and the third data item based on mapping data stored in the memory of the memory subsystem, wherein the mapping data includes physical addresses of the second data item and the third data item on the media; and
send, in response to the second command, the second data item and the third data item to the host system.

9. The non-transitory computer-readable medium of claim 8, wherein the processing device is further to:
obtain a third command from the host system to relate the second data item to a fourth data item;
update, in response to the third command, the relationship data stored in the memory of the memory subsystem to include a relation between the second data item and the fourth data item;
obtain a fourth command from the host system to read data items related to the first data item, wherein the fourth command indicates the relation to the first data item may be indirect; and
send, in response to the fourth command, the fourth data item to the host system based on the relation between the first data item and the second data item and the relation between the second data item and the fourth data item in the relationship data.

10. The non-transitory computer-readable medium of claim 8, wherein the processing device is further to:
obtain a third command from the host system to unrelate the first data item and the second data item; and
update, in response to the third command, the relationship data stored in the memory of the memory subsystem to remove the relation between the first data item and the second data item.

11. The non-transitory computer-readable medium of claim 8, wherein the first data item is identified by the host system with a first key and the second data item is identified by the host system with a second key and wherein the second command does not include the second key.

12. The non-transitory computer-readable medium of claim 8, wherein the processing device is further to:
obtain a third command from the host system to relate the first data item and the second data item with a group identifier;
update, in response to the third command, the relationship data stored in the memory of the memory subsystem to relate the first data item and the second data item to the group identifier;
obtain a fourth command from the host system to read data items related to the group identifier; and
send, in response to the fourth command, the first data item and the second data item to the host system based on the relation of the first data item and the second data item to the group identifier in the relationship data.

13. The non-transitory computer-readable medium of claim 8, wherein the first command identifies a strength of a relation between the first data item and the second data item.

14. The non-transitory computer-readable medium of claim 13, wherein the processing device is further to:
obtain a third command from the host system to request data items related to the first data item based on a threshold strength; and
send, in response to the third command, the second data item to the host system based on the relation between the first data item to the second data item in the relationship data if the strength of the relation between the first data item and the second data item is above the threshold strength.

15. A system comprising:
a plurality of memory components;
a random-access memory; and
a processing device, operatively coupled with the plurality of memory components and the random-access memory, to:
obtain a first command from a host system to relate a first data item to a second data item and a third data item, wherein the first data item, the second data item, and the third data item are stored in the plurality of memory components;
update, in response to the first command, relationship data stored in the random-access memory to include a relation between the first data item and the second data item and a relation between the first data item and the third data item;
obtain a second command from the host system to read data items related to the first data item, wherein the second command only identifies the first data item;
identify, in response to the second command, the second data item and the third data item based on the relation between the first data item and the second data item and the relation between the first data item and the third data item in the relationship data;
obtain, in response to the second command, the second data item and the third data item based on mapping data stored in the random-access memory, wherein the mapping data includes physical addresses of the second data item and the third data item in the plurality of memory components; and
send, in response to the second command, the second data item and the third data item to the host system.

16. The system of claim 15, wherein the processing device is further to:
- obtain a third command from the host system to relate the second data item to a fourth data item;
- update, in response to the third command, the relationship data stored in the random-access memory to include a relation between the second data item and the fourth data item;
- obtain a fourth command from the host system to read data items related to the first data item, wherein the fourth command indicates the relation to the first data item may be indirect; and
- send, in response to the fourth command, the fourth data item to the host system based on the relation between the first data item and the second data item and the relation between the second data item and the fourth data item in the relationship data.

17. The system of claim 15, wherein the processing device is further to:
- obtain a third command from the host system to unrelate the first data item and the second data item; and
- update, in response to the third command, the relationship data stored in the random-access memory to remove the relation between the first data item and the second data item.

18. The system of claim 15, wherein the first data item is identified by the host system with a first key and the second data item is identified by the host system with a second key and wherein the second command does not include the second key.

19. The system of claim 15, wherein the processing device is further to:
- obtain a third command from the host system to relate the first data item and the second data item with a group identifier;
- update, in response to the third command, the relationship data stored in the random-access memory to relate the first data item and the second data item to the group identifier;
- obtain a fourth command from the host system to read data items related to the group identifier; and
- send, in response to the fourth command, the first data item and the second data item to the host system based on the relation of the first data item and the second data item to the group identifier in the relationship data.

20. The system of claim 15, wherein the first command identifies a strength of a relation between the first data item and the second data item.

* * * * *